US012608897B2

(12) United States Patent
Sakuma et al.

(10) Patent No.: US 12,608,897 B2
(45) Date of Patent: Apr. 21, 2026

(54) COMPUTER-GENERATED INTERACTIVE HYBRID VIRTUAL ENVIRONMENT FOR ITEM PLACEMENT BASED ON FAMILIARITY

(71) Applicant: INTERNATIONAL BUSINESS MACHINES CORPORATION, Armonk, NY (US)

(72) Inventors: Katsuyuki Sakuma, Fishkill, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 18/464,685

(22) Filed: Sep. 11, 2023

(65) Prior Publication Data

US 2025/0086914 A1 Mar. 13, 2025

(51) Int. Cl.
*G06T 19/20* (2011.01)
*G06Q 30/0601* (2023.01)

(52) U.S. Cl.
CPC ......... *G06T 19/20* (2013.01); *G06Q 30/0643* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 10,095,929 B1 * | 10/2018 | Hoover | .............. | G06Q 30/0643 |
| 10,366,447 B2 | 7/2019 | Zhao | | |
| 11,580,592 B2 * | 2/2023 | Berger | .................. | G06T 19/006 |
| 11,663,781 B1 | 5/2023 | Alexander | | |
| 12,008,608 B2 * | 6/2024 | Black | ................. | G06Q 30/0643 |

(Continued)

OTHER PUBLICATIONS

Speicher, Marco, et al. "A virtual reality shopping experience using the apartment metaphor." Proceedings of the 2018 international conference on advanced visual interfaces. 2018. (Year: 2018).*

(Continued)

*Primary Examiner* — Ryan M Gray
(74) *Attorney, Agent, or Firm* — Steven M. Bouknight

(57) ABSTRACT

A customized computer-generated virtual environment corresponding to an environment familiar to a user for providing items in locations that are familiar to the user based on corresponding real-world environments and locations is provided. In association with the customized computer-generated virtual environment, a method may include generating an interactive virtual environment, wherein the generated interactive virtual environment includes virtual rooms and virtual areas based on the familiar environment. The method may also include identifying an item and a location of the item in the familiar environment, and correlating and associating the identified item with a corresponding location in the generated interactive virtual environment. The method may further include identifying and retrieving different items having a determined similarity to the identified item. The method may also include presenting the different items in the corresponding location of the generated interactive environment based on the determined similarity to the identified item.

20 Claims, 4 Drawing Sheets

(56) References Cited

U.S. PATENT DOCUMENTS

| | | | | |
|---|---|---|---|---|
| 2014/0214629 | A1* | 7/2014 | Azam | G06Q 30/0643 |
| | | | | 705/27.2 |
| 2014/0222627 | A1* | 8/2014 | Kukreja | G06Q 30/0643 |
| | | | | 705/27.2 |
| 2015/0248791 | A1* | 9/2015 | Abovitz | G02B 27/4227 |
| | | | | 345/633 |
| 2017/0116667 | A1* | 4/2017 | High | G06T 19/006 |
| 2018/0182025 | A1* | 6/2018 | Smith | G06Q 30/0623 |
| 2018/0374276 | A1* | 12/2018 | Powers | G06T 17/205 |
| 2019/0019242 | A1* | 1/2019 | Bajpai | G06Q 30/0603 |
| 2019/0130649 | A1* | 5/2019 | O'Brien | G06T 15/005 |
| 2019/0156582 | A1* | 5/2019 | Yankovich | G06Q 10/087 |
| 2020/0258144 | A1* | 8/2020 | Chaturvedi | G06Q 30/0633 |
| 2021/0065175 | A1* | 3/2021 | Sukhija | G06Q 20/40 |
| 2021/0279963 | A1* | 9/2021 | Silverstein | G06T 15/00 |
| 2022/0129974 | A1* | 4/2022 | Delgado | G06V 20/64 |
| 2025/0078146 | A1* | 3/2025 | Singh | G06F 3/04845 |
| 2025/0086914 | A1* | 3/2025 | Sakuma | G06T 19/20 |

OTHER PUBLICATIONS

Disclosed Anonymously, "Method and System for Commerce Shopping Recommendations with Automated Owned Product Discovery, Maintenance, and Compatibility", An IP.com Prior Art Database Technical Disclosure, IP.com No. IPCOM000266446D, IP.com Electronic Publication Date: Jul. 14, 2021, 6 pages.

Gomez, "VR in Shopping—Ultimate Guide", Koombea, Feb. 18, 2023, 8 pages, https://www.koombea.com/blog/vr-in-shopping/.

Heller, "32 Open House Ideas That Will Actually Get You Leads", Mar. 20, 23, 18 pages, https://www.agentadvice.com/real-estate-open-house-ideas/.

Koombea, "eCommerce Development Solutions", accessed Jun. 30, 2023, 14 pages, https://www.koombea.com/services/ecommerce-development-solutions/.

Koombea, "We Bring HiTech Apps to Life", accessed on Jul. 5, 2023, 11 pages, https://www.koombea.com/industries/hitech/.

* cited by examiner

100

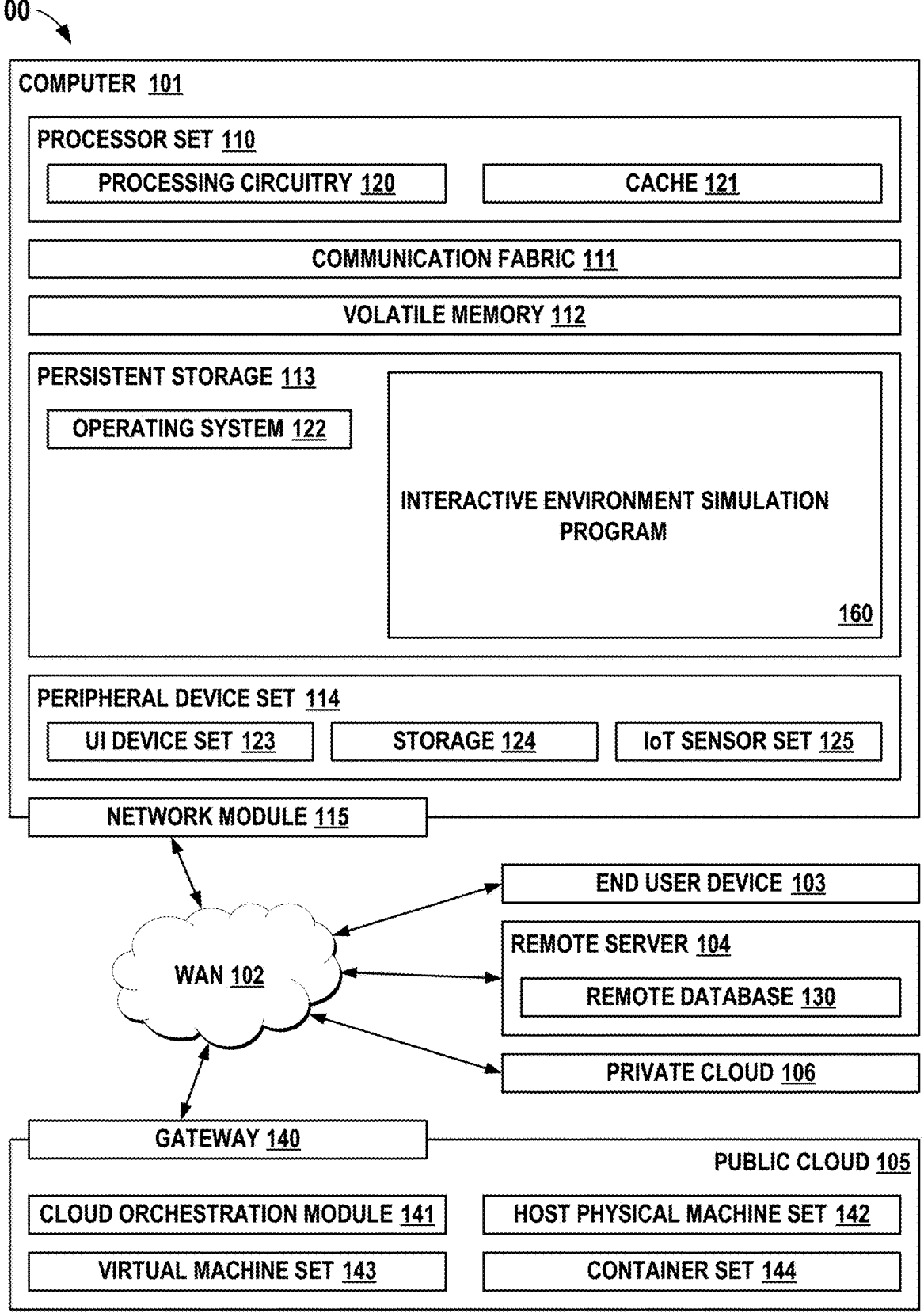

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

INTERACTIVE ENVIRONMENT SIMULATION PROGRAM

160

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

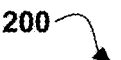

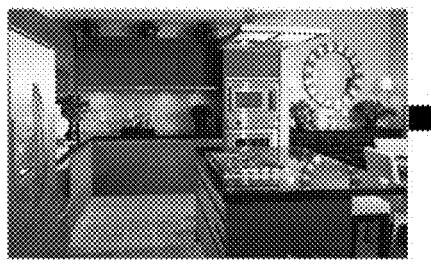

Capture IoT device system data including a smart ecosystem and/or a smart home, and capture media content including image and video data Familiar environment to user may include a user's home environment having different rooms such as a kitchen, and areas such as a smart fridge
204

Generation of a user profile, information regarding user interests, the familiar environment, items in the familiar environment, information that identifies a location of identified items in the familiar environment Different products/items may be kept in different virtual store environments 206

Virtual store environment 210

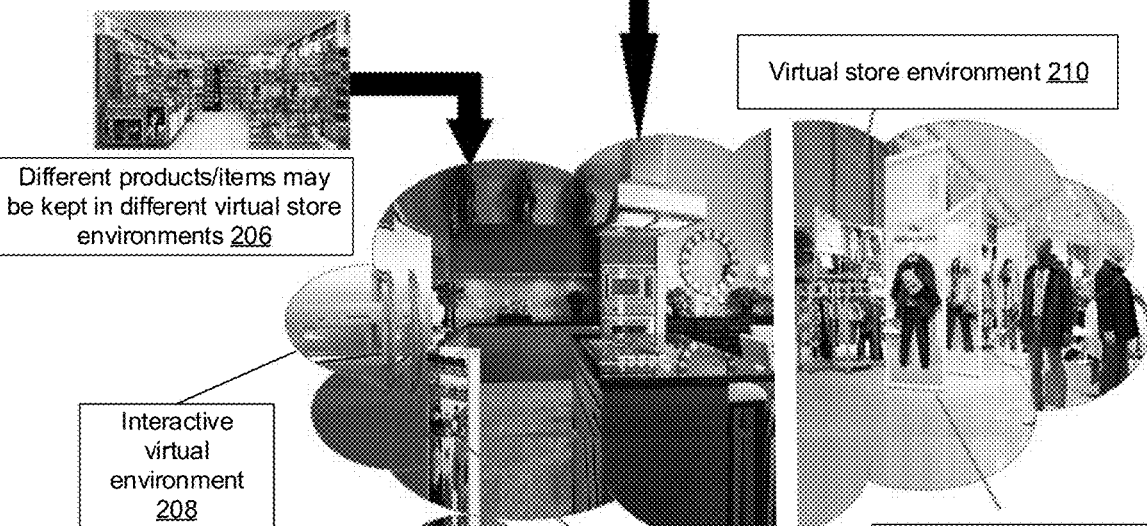

Interactive virtual environment 208

Different products/items from other virtual environments will be shown in interactive virtual environment that is more familiar to user .

Interactive virtual environment may provide user with Hybrid experience by showing this other virtual store environment in response to user selection of an option User wearing VR headset
202

FIG. 2

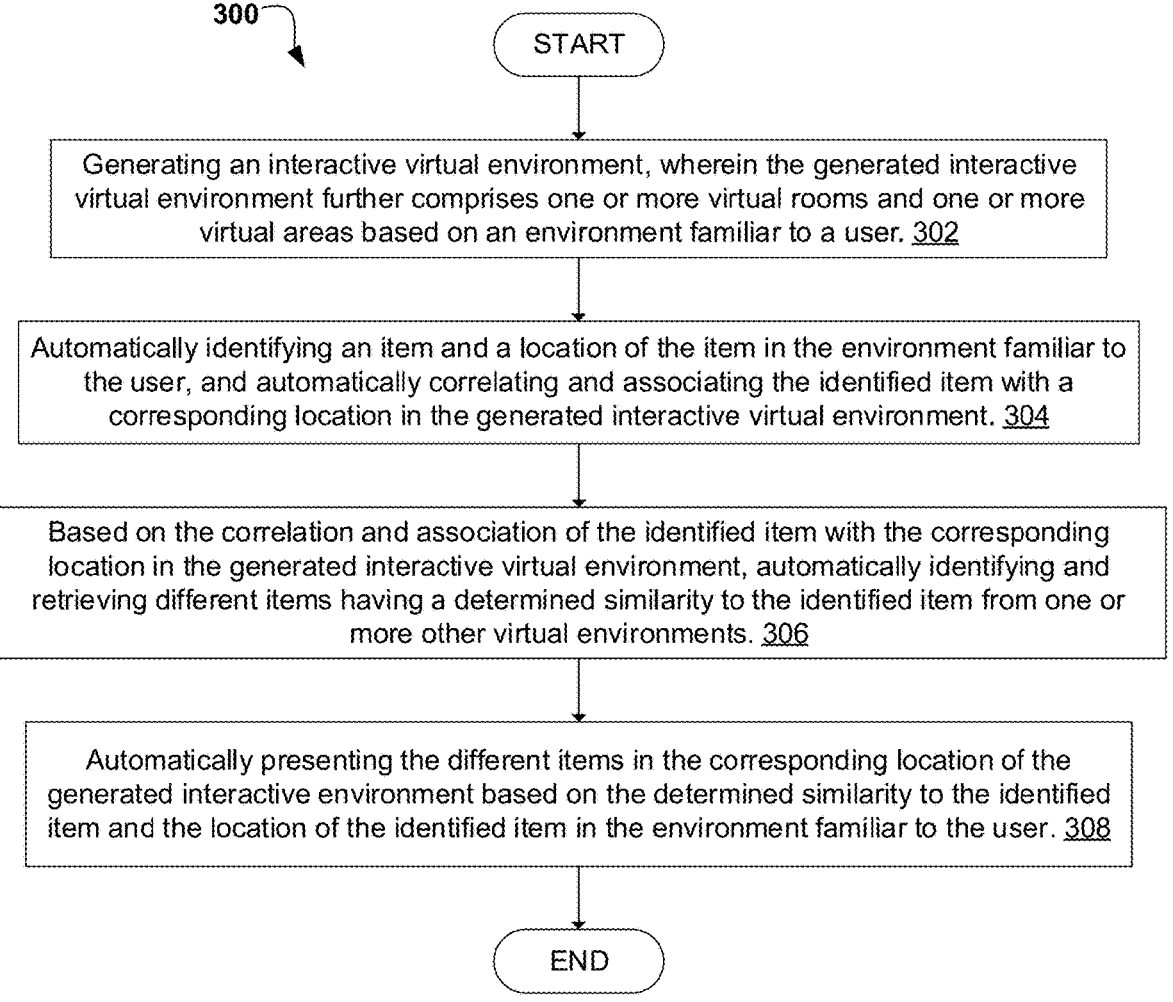

300

START

Generating an interactive virtual environment, wherein the generated interactive virtual environment further comprises one or more virtual rooms and one or more virtual areas based on an environment familiar to a user. 302

Automatically identifying an item and a location of the item in the environment familiar to the user, and automatically correlating and associating the identified item with a corresponding location in the generated interactive virtual environment. 304

Based on the correlation and association of the identified item with the corresponding location in the generated interactive virtual environment, automatically identifying and retrieving different items having a determined similarity to the identified item from one or more other virtual environments. 306

Automatically presenting the different items in the corresponding location of the generated interactive environment based on the determined similarity to the identified item and the location of the identified item in the environment familiar to the user. 308

END

FIG. 3

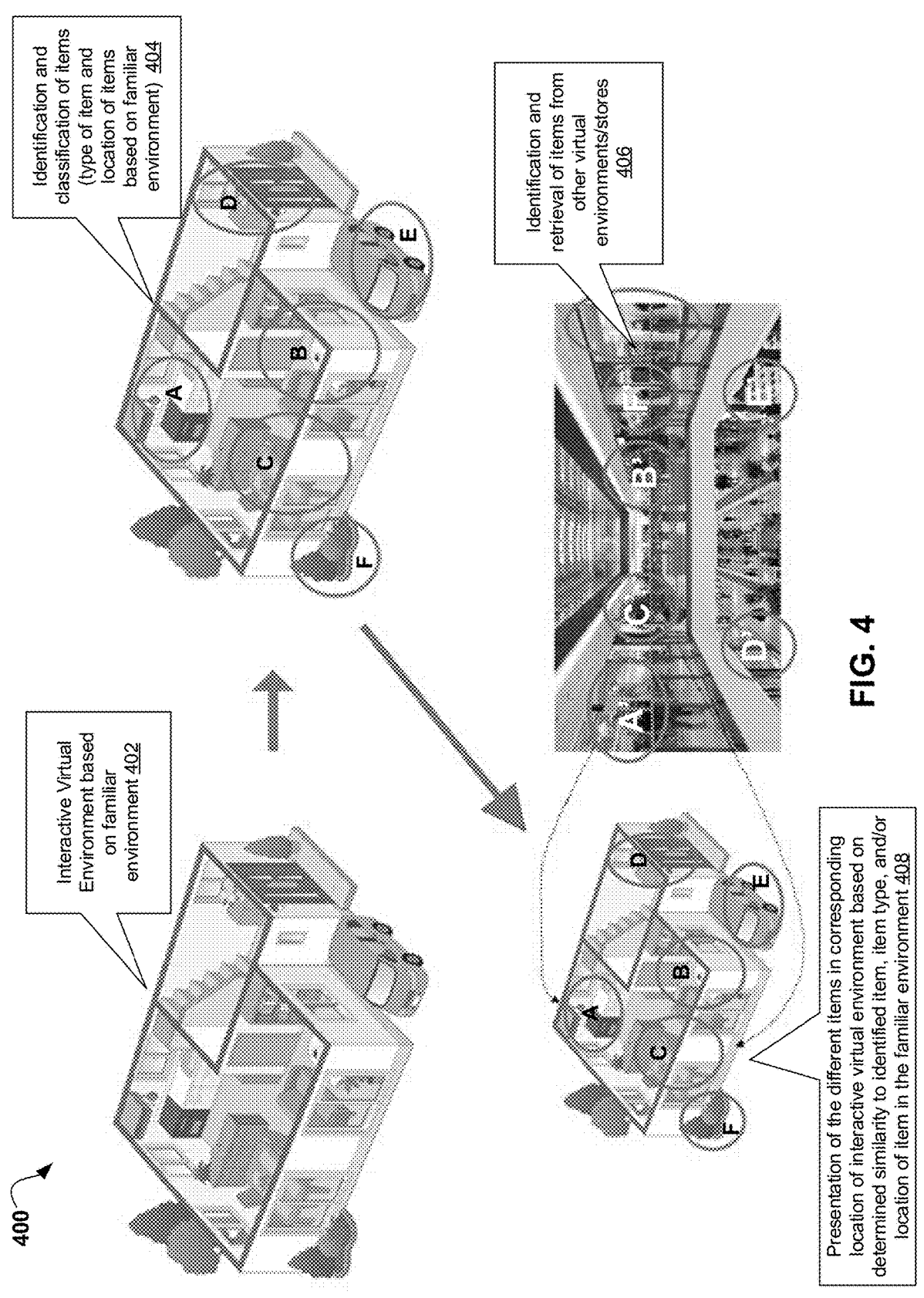

Interactive Virtual Environment based on familiar environment 402

Identification and classification of items (type of item and location of items based on familiar environment) 404

Identification and retrieval of items from other virtual environments/stores 406

Presentation of the different items in corresponding location of interactive virtual environment based on determined similarity to identified item, item type, and/or location of item in the familiar environment 408

COMPUTER-GENERATED INTERACTIVE HYBRID VIRTUAL ENVIRONMENT FOR ITEM PLACEMENT BASED ON FAMILIARITY

BACKGROUND

The present invention relates generally to the field of computing, and more specifically, to a customized computer-generated virtual environment corresponding to an environment familiar to a user for providing items in locations that are familiar to the user based on corresponding real-world environments and locations.

Generally, virtual reality (VR) is a simulated experience that employs pose tracking and three-dimensional (3D) near-eye displays to give a user an immersive feel of a virtual world. More specifically, VR includes a computer-generated simulation of a 3D image or environment that can be interacted with in a seemingly real or physical way by a person using special computer electronic equipment, such as a headset with a screen inside or gloves fitted with sensors. VR is employed in multiple industries including entertainment (particularly video games), education (such as medical or military training) and business (such as virtual meetings). Other distinct types of VR-style technology include augmented reality and mixed reality, sometimes referred to as extended reality or XR, although definitions are constantly changing due to the nascence of the industry. Currently, standard VR systems use either VR headsets or multi-projected environments to generate some realistic images, sounds and other sensations that simulate a user's physical presence in a virtual environment. As such, a person using VR equipment is able to look around the artificial world, move around in it, and interact with virtual features or items.

SUMMARY

A method for generating and providing an interactive virtual environment corresponding to an environment familiar to a user for presenting items in locations that are familiar to the user based on corresponding real-world environments and locations is provided. The method may further include generating an interactive virtual environment, wherein the generated interactive virtual environment further comprises one or more virtual rooms and one or more virtual areas based on an environment familiar to a user. The method may also include automatically identifying an item and a location of the item in the environment familiar to the user, and automatically correlating and associating the identified item with a corresponding location in the generated interactive virtual environment. The method may further include based on the correlation and association of the identified item with the corresponding location in the generated interactive virtual environment, automatically identifying and retrieving different items having a determined similarity to the identified item from one or more other virtual environments. The method may also include automatically presenting the different items in the corresponding location of the generated interactive environment based on the determined similarity to the identified item and the location of the identified item in the environment familiar to the user.

A computer system for generating and providing an interactive virtual environment corresponding to an environment familiar to a user for presenting items in locations that are familiar to the user based on corresponding real-world environments and locations is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may further include generating an interactive virtual environment, wherein the generated interactive virtual environment further comprises one or more virtual rooms and one or more virtual areas based on an environment familiar to a user. The method may also include automatically identifying an item and a location of the item in the environment familiar to the user, and automatically correlating and associating the identified item with a corresponding location in the generated interactive virtual environment. The method may further include based on the correlation and association of the identified item with the corresponding location in the generated interactive virtual environment, automatically identifying and retrieving different items having a determined similarity to the identified item from one or more other virtual environments. The method may also include automatically presenting the different items in the corresponding location of the generated interactive environment based on the determined similarity to the identified item and the location of the identified item in the environment familiar to the user.

A computer program product for generating and providing an interactive virtual environment corresponding to an environment familiar to a user for presenting items in locations that are familiar to the user based on corresponding real-world environments and locations is provided. The computer program product may include one or more computer-readable storage devices and program instructions stored on at least one of the one or more tangible storage devices, the program instructions executable by a processor. The computer program product may include program instructions to, The method may further include generating an interactive virtual environment, wherein the generated interactive virtual environment further comprises one or more virtual rooms and one or more virtual areas based on an environment familiar to a user. The method may also include automatically identifying an item and a location of the item in the environment familiar to the user, and automatically correlating and associating the identified item with a corresponding location in the generated interactive virtual environment. The method may further include based on the correlation and association of the identified item with the corresponding location in the generated interactive virtual environment, automatically identifying and retrieving different items having a determined similarity to the identified item from one or more other virtual environments. The method may also include automatically presenting the different items in the corresponding location of the generated interactive environment based on the determined similarity to the identified item and the location of the identified item in the environment familiar to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to one embodiment;

FIG. 2 is a diagram illustrating an expanded view and an example of the system architecture associated with a program for generating and providing an interactive virtual environment corresponding to an environment familiar to a user for presenting items in locations that are familiar to the user according to one embodiment;

FIG. 3 is an operational flowchart for generating and providing an interactive virtual environment corresponding to an environment familiar to a user for presenting items in locations that are familiar to the user based on corresponding real-world environments and locations according to one embodiment;

FIG. 4 is an above-view illustration of interactive virtual environment and a description of the representative of steps in the operational flowchart for generating and providing an interactive virtual environment corresponding to an environment familiar to a user for presenting items in locations that are familiar to the user according to one embodiment.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to providing a customized computer-generated interactive virtual environment corresponding to an environment familiar to a user for presenting items in locations that are familiar to the user based on corresponding real-world environments and locations. Specifically, the present invention may improve the technical field associated with electronic communications and transactions through virtual environments via VR and AR devices, by automatically generating an interactive virtual environment based on an environment familiar to a user, automatically determining and identifying items that are familiar and specific to a room and/or area within the generated interactive virtual environment, and in response to virtually detecting a user entering the room and/or interacting with the area in the interactive virtual environment, presenting/recommending purchasable items in the room and/or the area based on an identified similarity between a purchasable item among the purchasable items to the items that are determined and identified as being familiar and specific to the room and/or the area within the generated interactive virtual environment. As such, the present invention may automatically integrate environments familiar to a user into a customized computer-generated interactive virtual environment for presenting items in locations that are familiar to the user.

As previously described, VR is employed in a number of different industries including entertainment (particularly video games), education (such as medical or military training) and business (such as virtual meetings). Standard VR systems use VR headsets and other VR equipment or multi-projected environments to generate realistic images, sounds, and other sensations that simulate a user's physical presence in a virtual environment. As such, a person using VR equipment may be able to look around an artificial virtual world, move around in it, and interact with virtual features or items that may be representative of real-world items. Other applications of VR may include a VR shopping environment whereby customers may be allowed to tour a virtual store and virtually sample a company's products, try on clothes, makeup, etc., from the comfort of the user's home. Specifically, while navigating in any VR-based shopping system, the user can perform virtual or physical movement in the VR-based shopping system such as looking at a VR surrounding environment to find and select products/items virtually. Therefore, VR technology allow businesses to bring a shopping experience directly into a user's home.

However, in current VR shopping environments, VR shopping service providers may simulate a real-world shopping experience by presenting a VR store and arranging products in the VR store according to typical standards of real-world shopping where a customer needs to walk through a virtual aisle to search for desired products. Consequently, in such cases, users may spend an unnecessary amount of time to simply find products in the VR shopping environment similar to the difficulties of finding items in department stores. For example, a current VR shopping experience may include a user using a VR headset to grocery shop by virtually walking through aisles of a virtual grocery store to locate products of interest that, in turn, resembles a real-world grocery shopping experience. Currently, similar VR shopping experiences are also provided for clothes shopping, office shopping, electronics shopping, etc. As such, it may be advantageous to provide a virtual environment that is more familiar to a user whereby a user can easily find recommended and/or provided products specifically based on a location familiar to the user and according to where the user may keep such products. As previously described, while VR technology may allow businesses to bring a shopping experience directly into a user's home, it would be more advantageous to provide a VR shopping environment that integrates a virtual representation of the user's home (and/or a general home design) into the user's shopping experience. Thus, for example, as opposed to a VR shopping environment that forces a user to virtually walk and search through a virtual aisle to find desired products, the present invention may provide a customized VR shopping environment that may include a virtual representation of a user's home or other environment familiar to a user whereby a user may perform such actions as entering a virtual representation of the user's kitchen and view recommended products related to kitchenware and groceries, entering a virtual representation of the user's closet and view recommended products related to clothes, entering a virtual representation of the user's office and view recommended products related to office appliances, etc. Furthermore, according to embodiments, the VR shopping environment may not be limited to a home environment but may also include other environments (such as a warehouse, restaurant, stadium, etc.) Therefore, by generating the customized VR shopping environment that is familiar to a user, the present invention may enable the user to easily identify products/items of interest based on an area familiar to the user where the products/items may be typically kept by the user.

As such, the present invention provides a method, computer system, and computer program product for automatically generating an interactive virtual environment, wherein the generated interactive virtual environment further comprises one or more virtual rooms and one or more virtual areas based on an environment familiar to a user. Next, the method, computer system, and computer program product may automatically identify an item and a location of the item in the environment familiar to the user, and automatically correlate and associate the identified item with a corresponding location in the generated interactive virtual environment. Then, the method, computer system, and computer program product may, based on the correlation and association of the identified item with the corresponding location in the generated interactive virtual environment, automatically identify and retrieve different items having a determined similarity to the identified item from one or more other virtual environments. Thereafter, the method, computer system, and computer program product may automatically present the different items in the corresponding location of the generated interactive environment based on the determined similarity to the identified item and the location of the identified item in the environment familiar to the user.

Therefore, the present invention may provide a customized computer-generated interactive virtual environment corresponding to an environment familiar to a user for presenting items in locations that are familiar to the user based on corresponding real-world environments and locations. More specifically, the present invention may provide an interactive virtual environment based on an environment familiar to a user, determine and identify items that are familiar and specific to a room and/or area within the generated interactive virtual environment, and in response to virtually detecting a user entering the virtual room and/or interacting with the virtual area in the interactive virtual environment, present/recommend purchasable items in the virtual room and/or the virtual area based on an identified similarity between a purchasable item among the purchasable items to the items that are determined and identified as being familiar and specific to that virtual room and/or that virtual area within the generated interactive virtual environment.

The present invention may be a system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine whether directional input is received along with a query and, accordingly, adjust presented display content to include a referenced object in a center of a screen of a primary device.

Referring to FIG. 1, an exemplary computing environment 100 is depicted, according to at least one embodiment. Computing environment 100 contains an example of an environment for the execution of at least some of the computer code involved in performing the inventive methods, such as an interactive environment simulation program 160. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer (such as a wearable headset), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 160 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles, headsets, and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector and/or accelerometer.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the interactive environment simulation program 160 may be a program/ code capable of providing a method, computer system, and computer program product for automatically generating an interactive virtual environment, wherein the generated interactive virtual environment further comprises one or more virtual rooms and one or more virtual areas based on an environment familiar to a user. Next, the interactive environment simulation program 160 may automatically identify an item and a location of the item in the environment familiar to the user, and automatically correlate and associate the identified item with a corresponding location in the generated interactive virtual environment. Then, the interactive environment simulation program 160 may, based on the correlation and association of the identified item with the corresponding location in the generated interactive virtual environment, automatically identify and retrieve different items having a determined similarity to the identified item from one or more other virtual environments. Thereafter, the interactive environment simulation program 160 may automatically present the different items in the corresponding location of the generated interactive environment based on the determined similarity to the identified item and the location of the identified item in the environment familiar to the user.

Furthermore, notwithstanding depiction in computer 101, the interactive environment simulation program 160 may be stored in and/or executed by, individually or in any combination, with end user device 103, remote server 104, public cloud 105, and private cloud 106. The interactive environment simulation program is explained in further detail below with respect to FIGS. 2-4.

Referring now to FIG. 2, a diagram 200 illustrating an expanded view and an example of the system architecture of an interactive virtual environment 208 generated by the interactive environment simulation program 160 is depicted. As previously described in FIG. 1, computer 101 may take the form of a wearable headset. Accordingly, the interactive environment simulation program 160 may be integrated with a computer such as virtual reality (VR) headset device and/or augmented reality (AR) device. Generally, VR may include a simulated interactive virtual experience that employs pose tracking and 3D near-eye displays to give the user an immersive feel of a virtual world. Thus, for example, a VR device, such as VR headset 202 may immerse a user into an interactive VR experience or the interactive virtual environment 208 provided through the interactive environment simulation program 160 which may simulate a user's real-world environment based on an environment familiar to the user. Furthermore, generally, AR can be defined as a system that incorporates a combination of both real and virtual worlds, real-time interaction, and accurate 3D registration of virtual and real objects. Specifically, AR may include overlaid sensory information that can be constructive (i.e. additive to a natural real-world environment), or destructive (i.e. masking of the natural real-world environment). Thus, the AR experience can seamlessly be interwoven with the physical world such that it is perceived as an immersive aspect of the real environment. Therefore, similarly, an AR device may include a wearable AR device that also provides an interactive virtual experience presented by the interactive environment simulation program 160. The present invention may be implemented using the VR headset 202, other VR devices, and/or an AR device.

Referring back to FIG. 2, and as previously described, the interactive environment simulation program 160 may be integrated with the VR headset 202. Specifically, and according to one embodiment, the interactive environment simulation program 160 may automatically generate an interactive virtual environment 208 based on an environment that is familiar to a user (referred to hereinafter as "familiar environment"). Furthermore, according to one embodiment, and as depicted in FIG. 2, the familiar environment 204 may include a real-world environment such as a user's home environment. As depicted, the familiar environment 204 may further include rooms (such as kitchen, and other rooms that may include an office room, living room, etc.) as well as positions/areas within the room such as a cabinet, a refrigerator, shelves, containers etc. However, the familiar environment 204 may not be limited to a user's home environment and may further include other environments and venues that may be familiar to a user such as a work environment, a garage environment (which may also be part of a user's home environment), a warehouse environment, etc. As will be further described with respect to FIGS. 3-4, the interactive environment simulation program 160 may generate the interactive virtual environment 208 by generating a virtual representation of the familiar environment 204. According to one embodiment, the interactive environment simulation program 160 may generate the virtual representation using one or more computing devices to scan structures and elements of the familiar environment 204. For example, the interactive environment simulation program 160 may further be integrated with a computer 101 that includes a camera to capture images and/or video of the familiar environment, and in turn, convert the images and video using a VR converter to the virtual representation of the familiar environment 204 in generating the interactive virtual environment 208. In one example, a user may use a computer 101 such as a mobile phone device to capture the images and video of the familiar environment 204 which may be received by the interactive environment simulation program 160 running on the mobile phone device, and the interactive environment simulation program 160 may then convert the images and video to the virtual representation for presentation on the VR headset 202. Also, according to one embodiment, the interactive environment simulation program 160 may further provide a library/database that includes selectable templates/structures representative of a familiar environment 204 to generate the interactive virtual environment 208.

The interactive environment simulation program 160 may further determine and identify items associated with the familiar environment 204. More specifically, and as previously described, the interactive environment simulation program 160 may automatically determine and identify items that are familiar and specific to a room, area, and/or position within the familiar environment 204. According to one embodiment, the interactive environment simulation program 160 may determine and identify items associated with the familiar environment 204 by further being integrated with internet of things (IoT) devices such as smart appliances, smart cabinetry, smart cameras, smart closet, smart speakers, etc. The interactive environment simulation program 160 may receive information from the IoT devices such as receiving an IoT feed of items in a refrigerator. Furthermore, and according to one embodiment, the interactive environment simulation program 160 may use machine learning to generate a user profile, whereby the user profile may include a combination of information such as information about user interests, information regarding the familiar environment 204 associated with the user (including rooms, structures, etc.), information regarding identification of items in the familiar environment 204 (including image and video data of items/products, product names, barcodes etc.), and information that identifies a location of identified items in the familiar environment 204 (such as in a room, in an area, and/or in a certain position).

According to one embodiment, the interactive environment simulation program 160 may use the IoT devices, the user profile, and the combination of information within the user profile to generate the interactive virtual environment 208 as well as to identify purchasable items/products from virtual stores 206 to present to the user in the interactive virtual environment 208. Specifically, and as previously described, in response to detecting (via the VR headset 202) a user entering or being located in a specific room and/or interacting with a specific area in the interactive virtual environment 208, the interactive environment simulation program 160 may present/recommend purchasable items in that specific room and/or that specific area based on an identified similarity between a purchasable item (among different purchasable items from different virtual stores 206) to the items that were determined and identified as being familiar and specific to that specific room and/or that specific area within the generated interactive virtual environment 208. Thus, the interactive environment simulation program 160 may be integrated with known and different virtual stores 206 to retrieve different purchasable items from the different virtual stores 206 that may be of interest to the user and, in turn, present such purchasable items in rooms and areas more familiar to the user within the interactive virtual environment 208.

More specifically, and as previously described and depicted in virtual store 206 in FIG. 2. VR shopping service providers may typically simulate a real-world shopping experience by presenting a VR store and arranging purchasable items/products in the VR store (such as on shelves) according to typical standards of real-world shopping where a customer needs to virtually walk and search through a virtual aisle to find desired products. Thus, as opposed to the virtual store 206, which forces a user to virtually walk and search through a virtual aisle to find desired products, the interactive environment simulation program 160 may provide the interactive virtual environment 208 that is familiar to a user which may be based on a familiar environment 204 such as a user's home environment. Accordingly, the interactive environment simulation program 160 may be allow a user to perform such actions as: entering a virtual representation of the user's kitchen and view recommended purchasable items related to kitchenware, open a virtual representation of a refrigerator and view recommend purchasable items related to groceries that are similar to or typically found in the user's refrigerator based on the user profile, open a virtual representation of a cabinet and view recommended purchasable items typically found in the user's cabinet based on the user profile, enter a virtual representation of the user's closet and view recommended purchasable items related to clothes, enter a virtual representation of the user's office and view recommended purchasable items related to office appliances, etc.

According to one embodiment, the interactive environment simulation program 160 may further provide the user with a hybrid scenario where the interactive environment simulation program 160 may, in addition to providing the interactive virtual environment 208, also provides the virtual store 206 associated with the VR shopping service providers. For example, in the hybrid scenario, the interactive environment simulation program 160 may first present the purchasable items/products from different virtual stores 206 in specific rooms and areas in the interactive virtual environment 208 as previously described. Thus, for example, when viewing a virtual closet room in the interactive virtual environment 208 via the VR headset 202, clothes from different virtual stores may be virtually presented in the virtual closet room. Then, in response to detecting a user indicating an interest in a particular piece of clothing (for example, by detecting the user virtually selecting the particular piece of clothing in the interactive virtual environment), the interactive environment simulation program 160 may present the user with a first option to purchase that particular piece of clothing from the interactive virtual environment 208. In addition, the interactive environment simulation program 160 may present the user with a second option to select the virtual store associated with that particular piece of clothing, whereby selecting the second option prompts the interactive environment simulation program 160 to virtually take the user (or switch) to another virtual store 210 provided by the VR shopping provider associated with that particular piece of clothing to allow the user to view other products by the virtual store provider.

Referring now to FIG. 3, an operational flowchart 300 for a program for automatically generating the interactive virtual environment 208 (FIG. 2) based on the familiar environment 204 (FIG. 2), automatically determining and identifying items that are familiar and specific to a room and/or area within the generated interactive virtual environment 208 (FIG. 2), and in response to virtually detecting a user entering the room and/or interacting with the area in the interactive virtual environment 208 (FIG. 2), presenting/recommending purchasable items in the room and/or the area based on an identified similarity between a purchasable item among the purchasable items to the items that are determined and identified as being familiar and specific to the room and/or the area within the generated interactive virtual environment. The operational flowchart 300 will be further described with references to FIG. 4, whereby FIG. 4 includes an above-view illustration 400 of the interactive virtual environment and a description of the representative steps in the operational flowchart 300.

As depicted in FIG. 3 at 302, the interactive environment simulation program 160 may generate the interactive virtual environment 402 by generating a virtual representation of the familiar environment, whereby the generated interactive virtual environment further includes virtual rooms and virtual areas based on the environment that is familiar to a user. Specifically, according to one embodiment, the interactive environment simulation program 160 may generate the virtual representation using or leveraging one or more computing devices to scan/identify rooms, areas, structures and other elements of the familiar environment which may include a real-world environment. For example, and according to one embodiment, the interactive environment simulation program 160 may generate the interactive virtual environment 402 as depicted in FIG. 4 that includes a virtual representation of the familiar environment by using one or more computers 101 (FIG. 1) that may include a camera to capture images and/or video of the familiar environment, and in turn, convert the images and video using a VR converter to the virtual representation of the familiar environment in generating the interactive virtual environment 402 (FIG. 2). For example, a user may use a computer 101 (FIG. 1) such as a mobile phone device to capture the images and video of the familiar environment which may be received by the interactive environment simulation program 160 running on the mobile phone device. More specifically, the interactive environment simulation program 160 may receive images and/or video that may include images/video of an interior as well as an exterior of the familiar environment such as, but not limited to: images/video of rooms including a kitchen, a bedroom, an office, a bathroom, etc., images/video of areas including a closet, shelves, a cabinet, an outdoor garden, etc., and other interior and exterior aspects of the familiar environment. According to one embodiment, the interactive environment simulation program 160 may further identify rooms and areas in the images and video using machine learning algorithms such as image classification algorithms, computer vision and image recognition algorithms, linear regression, logistic regression, reinforcement learning, K-means clustering, decision-making, and other machine learning algorithms. The interactive environment simulation program 160 may further include, leverage, and/or be integrated with IoT devices (including smart devices) to further identify different rooms, areas, structures, and/or appliances in the familiar environment. Specifically, and as previously described, the interactive environment simulation program 160 may be integrated with IoT devices such as a smart appliances, smart cabinetry, smart cameras, smart closet, smart speakers, etc. For example, the interactive environment simulation program 160 may identify rooms and/or areas using smart cameras and may further identify a type of refrigerator in the familiar environment based on the refrigerator being a smart refrigerator (which may communicate a brand and/or version of the refrigerator to the interactive environment simulation program 160). In turn, the interactive environment simulation program 160 may include, leverage, and/or be integrated with VR conversion hardware and/or software to convert the images, video, and other received information to the virtual representation and generate the interactive virtual environment 402 which may be presented via a computer 101 (FIG. 1) such as the VR headset 202 (FIG. 2). As such, the interactive virtual environment 402 generated by the interactive environment simulation program 160 may be a digital recreation of a familiar environment which may include or be associated with a real-world environment.

Furthermore, according to one embodiment and as previously described, the interactive environment simulation program 160 may generate the interactive virtual environment 402 by further providing a library/database that includes selectable templates including different designs, structures and other elements used to represent a familiar environment. Specifically, the interactive environment simulation program 160 may provide a user interface, whereby the user interface may further provide a user with options to create the interactive virtual environment 402. More specifically, the interactive environment simulation program 160 may provide options that may include one or more templates of familiar environments such as different templates of a home environment. For example, the different templates of the home environment may represent different home designs and/or different virtual representations of a home, a room, and/or an area that may be associated with a familiar environment. More specifically, for example and according to one embodiment, one template may be of a home design that includes 3 bedrooms and 2 baths, another template may be a design of 1-bedroom apartment, another template may include a design of specific room such as an office room, another template may include an outdoor garage, etc. Therefore, according to one embodiment, different templates may include different designs of a familiar environment and/or designs of specific rooms, areas, and structures that may be found in the familiar environment to be selected as a virtual representation of the familiar environment in generating the interactive virtual environment. Thus, according to one embodiment, a selectable template may include a complete home design and/or individual selectable templates may be combined to generate the home design. Specifically, and as described, there may be different templates/options for a bathroom design, a kitchen design, a bedroom design, etc. Accordingly, through the user interface, the interactive environment simulation program 160 may enable a user to generate/build the interactive virtual environment 402 which may be based on a familiar environment (such as a home environment) by combining different templates in different ways (for example, a user may select to have a master bedroom on a first floor and no living room while another user may select to have the master bedroom on the second floor with a bathroom). Thus, the selectable options may provide different structures/designs of the home, a room, and/or an area for generating the interactive virtual environment 402.

Next, at 304 in FIG. 3 and as depicted in 404 in FIG. 4, the interactive environment simulation program 160 may automatically identify items and a location of the identified items in the familiar environment and correlated and associate the identified items with a corresponding location in the generated interactive virtual environment 404. More specifically, the interactive environment simulation program 160 may correlate and associate the identified items with a virtual room and/or virtual area within the generated interactive virtual environment 402 based on the location of the identified item in the familiar environment, whereby automatically identifying an item and correlating and associating items with the corresponding location further includes automatically determining a type of item associated with the identified item, and correlating and associating the identified item and the determined type of item with the virtual room and/or the virtual area where that identified item and the determined type of item may be found (based on the location in the familiar environment). To further facilitate identification and determination of different types of items and an association between a type of item and a virtual room and/or virtual area, the interactive environment simulation program 160 may further include/generate a user profile for a user. As previously described, the interactive environment simulation program 160 may use machine learning to generate the user profile, whereby the user profile may include a combination of identified information such as information about user interests (including online purchase history from a user), information regarding familiar environments associated with the user (including images and video of a familiar environment, data of items/products, product names, barcodes in the familiar environment, etc.), information regarding different interactive virtual environments (if more than one) associated with the user that may be based familiar environments (including virtual representations of rooms, areas, and structures), and information that identifies and associates items with a specific location in the interactive virtual environment 402 (such as in a room, in an area, and/or in a certain position).

Thus, according to one embodiment, the interactive environment simulation program 160 may automatically identify and determine items associated with a familiar environment and associate such items with a location in the generated interactive virtual environment 404 as well as with a user via the generated user profile (including associating such items with a user interest). According to one embodiment, the interactive environment simulation program 160 may identify and associate items using machine learning algorithms based on received images and video such as by using image classification algorithms, computer vision and image recognition algorithms, linear regression, logistic regression, reinforcement learning, K-means clustering, decision-making, and other algorithms. For example, based on received images and/or video of a familiar environment, the interactive environment simulation program 160 may identify items such as clothes as well as identify that the clothes are kept in an upstairs closet of a specific bedroom, and therefore, may identify clothes as the type of item typically kept in that location/closet of that specific bedroom). Therefore, the interactive environment simulation program 160 may associate clothes as the type of item to present in the virtual representation of that closet in the interactive virtual environment 404. Furthermore, similar to using the IoT devices to identify different rooms, areas, and structures in a familiar environment, the interactive environment simulation program 160 may further use such IoT devices to identify items and types of items in the familiar environment and correspondingly associate such items with rooms and areas in the interactive virtual environment 404. For example, the interactive environment simulation program 160 may receive information from the IoT devices such as receiving an IoT camera feed associated with a smart refrigerator that identifies items in the smart refrigerator, whereby the camera feed may scan a barcode, brand name, and/or other information associated with an item to identify the item and/or the item type including identifying milk, identifying a type or brand of juice, identifying produce, identifying meat, identifying condiments, and identifying other refrigerator kept items. Similarly, the interactive environment simulation program 160 may identify items by receiving images and video from a computer (such as images captured by a user's mobile phone as previously described), whereby such images may be of a user's closet and items within the closet. Additionally, the interactive environment simulation program 160 may identify items based on user purchase history. As previously described, the interactive environment simulation program 160 may include/generate a user profile for identifying and associating different types of information with specific a user, whereby one type of information may include user purchase history of previously purchased items to identify items as well as identify user interests.

As previously described, the interactive environment simulation program 160 may further correlate and associate each identified item and/or type of item with a room and/or area in the interactive virtual environment as depicted at 404 in FIG. 4. Thus, for example and as depicted in FIG. 4 at 404, the interactive environment simulation program 160 may identify kitchen items that may be found in a kitchen and/or groceries that may be found in the smart refrigerator in the familiar environment and, in turn, associate such kitchen items (and other types of items identified as kitchen items in general) with a virtual kitchen room, A, and associate such groceries (and other types of items identified as groceries in general) with a corresponding virtual area that includes a refrigerator, in the interactive virtual environment 404. Similarly, the interactive environment simulation program 160 may associate other identified items in the familiar environment with a location in the interactive virtual environment 404 whereby the interactive environment simulation program 160 may, for example: associate identified living room furniture and electronics (and other types of items identified as living room furniture and electronics in general) with a virtual living room, B, in the interactive virtual environment 404; associate identified bathroom items (and other types of items identified as bathroom items in general) with virtual representations of bathrooms in the interactive virtual environment 404, associate identified dining furniture and supplies (and other types of items identified as dining furniture and supplies in general) with a virtual dining room, C, in the interactive virtual environment 404, associate identified items found in an entryway (and/or entryway items in general) with a virtual entryway room, D, in the interactive virtual environment 404; associate identified garage item (and other types of items identified as garage items in general) with a virtual garage room and/or area, E, in the interactive virtual environment 404; associate identified garden items (and other types of items identified as garden items in general) with a virtual garden area, F, in the interactive virtual environment 404; as well as associate identified clothes (and other types of items identified as clothes in general) with a virtual closet room in the interactive virtual environment (whereby the interactive environment simulation program 160 may further distinguish between a first type of closet for clothes from a second type of closet which may be used for other items, such as a linen closet or pantry); etc. In turn, and as will be described, in response to detecting a user entering and/or interacting with a certain virtual room and/or virtual area represented and depicted in the interactive virtual environment 404, the interactive environment simulation program 160 may recommend/display purchasable items of a same or similar type that correspond to the type of items identified for and associated with that certain virtual room and/or area.

Specifically, and as depicted at 306 in FIGS. 3 and 406 in FIG. 4, based on the correlation and association of the identified item and the determined type of item to the at least one of the virtual room and the virtual area, the interactive environment simulation program 160 may automatically identify and retrieve different items having the determined similarity to the identified item and the determined type of item from other virtual environments that include other virtual stores. As previously described, the interactive environment simulation program 160 may further include, leverage, and/or be integrated with known and different virtual stores 406 to retrieve different purchasable items from the different virtual stores 406 that may be of interest to the user and, in turn, present such purchasable items in the virtual rooms and the virtual areas that are more familiar to the user within the interactive virtual environment 408. More specifically, the interactive environment simulation program 160 may use the IoT devices, the user profile, and the combination of information within the user profile to generate the interactive virtual environment as previously described as well as to identify purchasable items/products from virtual stores 206 to present to the user in the interactive virtual environment 408. For example, and as previously described at step 304, the interactive environment simulation program 160 may automatically identify items and determine a location of items in the familiar environment as well as correlate and associate such items with a corresponding location in the generated interactive virtual environment including associating such items with a user interest. The interactive environment simulation program 160 may further identify and use a user's online purchasing history to identify user interest and recommendations for purchasable items. The interactive environment simulation program 160 may further use the machine learning that was previously described as well as use natural language processing to identify a type of item associated with the different types of items in the different virtual stores 306. In turn, based on the type of items that are correlated and associated with a virtual room and/or virtual area in the interactive virtual environment 408, the interactive environment simulation program 160 may correspondingly identify and retrieve the same or similar types of purchasable items for recommendation and presentation in the virtual room and/or area. For example, and as depicted in 406 and 408, the interactive environment simulation program 160 may identify a kitchen in the familiar environment as well as kitchen items that may be found in the kitchen in the familiar environment. Thus, in turn, the interactive environment simulation program 160 may correlate and associate such kitchen items (and other types of items identified as kitchen items in general) with a corresponding virtual kitchen room, A, represented in the interactive virtual environment 408. As such, the interactive environment simulation program 160 may correspondingly identify and retrieve purchasable kitchen items from kitchen and other departments, A', in different virtual stores 406 for presentation in the virtual kitchen room, A. Similarly, the interactive environment simulation program 160 may correspondingly identify and retrieve dining furniture and supplies from dining or other departments, C', in different virtual stores 406 for presentation in the virtual dining room, C, in the interactive virtual environment 408. As previously described, the interactive environment simulation program 160 may further use the IoT devices, the user profile, and the combination of information within the user profile to further assist in identifying purchasable items of interest to the user from the different virtual stores 406.

Thereafter, as depicted at 308 in FIGS. 3 and 408 in FIG. 4, the interactive environment simulation program 160 may automatically present the different items in the corresponding location of the generated interactive environment 408 based on the determined similarity to the identified item and the location of the identified item in the environment familiar to the user (i.e. the familiar environment). More specifically, the interactive environment simulation program 160 may automatically present the different items in the corresponding location of a virtual room and/or virtual area based on the determined similarity to the identified item and the determined type of item and the correlation and association of the identified item and the determined type of item to the virtual room and the virtual area. For example, in response to detecting a user entering and/or interacting with a certain virtual room and/or virtual area represented and depicted in the interactive virtual environment 408, the interactive environment simulation program 160 may recommend/display purchasable items of a same or similar type that correspond to the type of item identified and associated with that certain virtual room and/or area. For example, through the VR headset 202 (FIG. 2), the interactive environment simulation program 160 may detect the user entering a virtual kitchen room, A, that is determined to have kitchen items correlated and associated with that virtual kitchen room. Therefore, in response, the interactive environment simulation program 160 may retrieve purchasable kitchen items from different virtual stores 406 to present in the virtual kitchen room, A. Similarly, the interactive environment simulation program 160 may detect a user interacting with a virtual area such as opening a virtual refrigerator in the virtual kitchen room of the interactive virtual environment 408, and therefore, may retrieve and recommend/display purchasable items related to groceries that may be similar to or typically found in the user's refrigerator in a familiar environment and/or based on the user profile. According to one embodiment, displaying the purchasable item in the virtual room and/or the virtual area may include virtually presenting/projecting an interactive virtual image of the purchasable item at the corresponding location where such purchasable item may typically be found in the virtual room/area (which may be further based on the user profile including image and video data as previously described). Along with virtually presenting/projecting an interactive virtual image of the purchasable item, the interactive environment simulation program 160 may further present/project item information associated with the purchasable item including, but not limited to, brand and pricing information, product description, sizing information, QR code, product number, product reviews, and information associated with the virtual store that includes the purchasable item. Furthermore, and as previously described, in response to detecting a user indicating an interest in a presented purchasable item (for example, by detecting the user using VR device gloves to virtually select and/or pick up a particular purchasable item in the interactive virtual environment), the interactive environment simulation program 160 may present the user with one option to purchase that particular purchasable item directly from/through the interactive virtual environment 408. In addition, according to one embodiment, the interactive environment simulation program 160 may also present the user with a second option to select the virtual store 206 store associated with the purchasable, whereby selecting the second option prompts the interactive environment simulation program 160 to virtually take the user (or switch) to the virtual store 406 that includes the purchasable item and may also allow the user to view other purchasable items provided by that virtual store 406.

It may be appreciated that FIGS. 2-4 provide only illustrations of one implementation and does not imply any limitations with regard to how different embodiments may be implemented. Many modifications to the depicted environments may be made based on design and implementation requirements. For example, and as previously described, the present invention may be implemented using the VR headset 202, other VR devices, and/or an AR device. As previously described, AR can be defined as a system that incorporates a combination of both real and virtual worlds, real-time interaction, and accurate 3D registration of virtual and real objects. Specifically, AR may include overlaid sensory information that can be additive to a natural real-world environment. Thus, the AR experience can seamlessly be interwoven with the physical world such that it is perceived as an immersive aspect of the real environment. Therefore, in the case of an AR device (such as AR glasses), the present invention may use AR to automatically present/project the different items in a location of the familiar environment (i.e. using the AR device to project an item and item info from different virtual stores onto locations of a real-world familiar environment, whereby the projected item and item info may be overlaid on the real-world familiar environment) based on the correlation and association of that item to identified items typically found in that location in the familiar environment.

As previously described, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, machine learning as described herein may broadly refer to machine learning algorithms that learn from data. More specifically, machine learning is a branch of artificial intelligence that relates to algorithms such as mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusters, such as k-means clusters, mean-shift clusters, and spectral clusters; (v) factorization machines, principal component analyzers and kernel principal component analyzers; and (vi) ensembles or other combinations of machine-learning models. Neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

What is claimed is:

1. A computer-implemented method, comprising:

generating an interactive virtual environment, wherein the generated interactive virtual environment further comprises one or more virtual rooms and one or more virtual areas based on an environment familiar to a user;

automatically identifying an item and a location of the item in the environment familiar to the user, and automatically correlating and associating the identified item with a corresponding location in the generated interactive virtual environment;

based on the correlation and association of the identified item with the corresponding location in the generated interactive virtual environment, automatically identifying and retrieving different items having a determined similarity to the identified item from one or more other different virtual environments, wherein the automatically identifying and retrieving the different items further comprises integrating and leveraging the one or more other different virtual environments having different virtual stores and retrieving the different items from the different virtual stores, wherein the different virtual stores are associated with different virtual store providers; and automatically presenting the different items in the corresponding location of the generated interactive environment based on the determined similarity to the identified item and the location of the identified item in the environment familiar to the user, wherein automatically presenting the different items in the corresponding location of the generated interactive environment further comprises automatically presenting an option to select a specific virtual store associated with a particular item and corresponding to a specific virtual store provider, and in response to detecting user selection of the option, automatically switching virtually to the specific virtual store provided by the specific virtual store provider, wherein the specific virtual store includes other items by the specific virtual store provider.

2. The computer-implemented method of claim 1, wherein generating the interactive virtual environment further comprises:

generating a virtual representation of the environment familiar to the user based on received media content and internet of things (IoT) device data, wherein generating the virtual representation further comprises converting the received media content and the IoT device data to the generated interactive virtual environment using a virtual reality (VR) converter.

3. The computer-implemented method of claim 1, wherein generating the interactive virtual environment further comprises:

generating a virtual representation of the environment familiar to the user based on selected templates from a database of templates comprising different designs of the one or more virtual rooms and the one or more virtual areas.

4. The computer-implemented method of claim 1, wherein automatically identifying the item and automatically correlating and associating the identified item with the corresponding location in the generated interactive virtual environment further comprises:

automatically determining a type of item associated with the identified item, and correlating and associating the identified item and the determined type of item with at least one of a virtual room from the one or more virtual rooms and a virtual area from the one or more virtual areas.

5. The computer-implemented method of claim 4, wherein automatically identifying and retrieving the different items further comprises:

based on the correlation and association of the identified item and the determined type of item to the at least one of the virtual room and the virtual area, automatically identifying and retrieving the different items having the determined similarity to the identified item and the determined type of item from the one or more other virtual environments.

6. The computer-implemented method of claim 5, wherein automatically presenting the different items in the corresponding location of the generated interactive environment further comprises:

automatically presenting the different items in the corresponding location of the at least one of the virtual room and the virtual area based on the determined similarity to the identified item and the determined type of item and the correlation and association of the identified item and the determined type of item to the virtual room and the virtual area.

7. The computer-implemented method of claim 1, wherein automatically presenting the different items further comprises:

automatically projecting a virtual representation of the different items in the corresponding location, wherein automatically projecting the virtual presentation further comprises presenting virtual images of the different items and information associated with the different items.

8. A computer system, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

generating an interactive virtual environment, wherein the generated interactive virtual environment further comprises one or more virtual rooms and one or more virtual areas based on an environment familiar to a user;

automatically identifying an item and a location of the item in the environment familiar to the user, and automatically correlating and associating the identified item with a corresponding location in the generated interactive virtual environment;

based on the correlation and association of the identified item with the corresponding location in the generated interactive virtual environment, automatically identifying and retrieving different items having a determined similarity to the identified item from one or more other different virtual environments, wherein the automatically identifying and retrieving the different items further comprises integrating and leveraging the one or more other different virtual environments having different virtual stores and retrieving the different items from the different virtual stores, wherein the different virtual stores are associated with different virtual store providers; and automatically presenting the different items in the corresponding location of the generated interactive environment based on the determined similarity to the identified item and the location of the identified item in the environment familiar to the user, wherein automatically presenting the different items in the corresponding location of the generated interactive environment further comprises automatically presenting an option to select a specific virtual store associated with a particular item and corresponding to a specific virtual store provider, and in response to detecting user selection of the option, automatically switching virtually to the specific virtual store provided by the specific virtual store provider, wherein the specific virtual store includes other items by the specific virtual store provider.

9. The computer system of claim 8, wherein generating the interactive virtual environment further comprises:

generating a virtual representation of the environment familiar to the user based on received media content and internet of things (IoT) device data, wherein generating the virtual representation further comprises converting the received media content and the IoT device data to the generated interactive virtual environment using a virtual reality (VR) converter.

10. The computer system of claim 8, wherein generating the interactive virtual environment further comprises:

generating a virtual representation of the environment familiar to the user based on selected templates from a database of templates comprising different designs of the one or more virtual rooms and the one or more virtual areas.

11. The computer system of claim 8, wherein automatically identifying the item and automatically correlating and associating the identified item with the corresponding location in the generated interactive virtual environment further comprises:

automatically determining a type of item associated with the identified item, and correlating and associating the identified item and the determined type of item with at least one of a virtual room from the one or more virtual rooms and a virtual area from the one or more virtual areas.

12. The computer system of claim 11, wherein automatically identifying and retrieving the different items further comprises:

based on the correlation and association of the identified item and the determined type of item to the at least one of the virtual room and the virtual area, automatically identifying and retrieving the different items having the determined similarity to the identified item and the determined type of item from the one or more other virtual environments.

13. The computer system of claim 12, wherein automatically presenting the different items in the corresponding location of the generated interactive environment further comprises:

automatically presenting the different items in the corresponding location of the at least one of the virtual room and the virtual area based on the determined similarity to the identified item and the determined type of item and the correlation and association of the identified item and the determined type of item to the virtual room and the virtual area.

14. The computer system of claim 8, wherein automatically presenting the different items further comprises:

automatically projecting a virtual representation of the different items in the corresponding location, wherein automatically projecting the virtual presentation further comprises presenting virtual images of the different items and information associated with the different items.

15. A computer program product for automatically generating, correlating, and presenting visual content along with an audio stream associated with an audiobook, comprising:

one or more tangible computer-readable storage devices and program instructions stored on at least one of the one or more tangible computer-readable storage devices, the program instructions executable by a processor, the program instructions comprising:

generating an interactive virtual environment, wherein the generated interactive virtual environment further comprises one or more virtual rooms and one or more virtual areas based on an environment familiar to a user;

automatically identifying an item and a location of the item in the environment familiar to the user, and automatically correlating and associating the identified item with a corresponding location in the generated interactive virtual environment;

based on the correlation and association of the identified item with the corresponding location in the generated interactive virtual environment, automatically identifying and retrieving different items having a determined similarity to the identified item from one or more other different virtual environments, wherein the automatically identifying and retrieving the different items further comprises integrating and leveraging the one or more other different virtual environments having different virtual stores and retrieving the different items from the different virtual stores, wherein the different virtual stores are associated with different virtual store providers; and automatically presenting the different items in the corresponding location of the generated interactive environment based on the determined similarity to the identified item and the location of the identified item in the environment familiar to the user, wherein automatically presenting the different items in the corresponding location of the generated interactive environment further comprises automatically presenting an option to select a specific virtual store associated with a particular item and corresponding to a specific virtual store provider, and in response to detecting user selection of the option, automatically switching virtually to the specific virtual store provided by the specific virtual store provider, wherein the specific virtual store includes other items by the specific virtual store provider.

16. The computer program product of claim 15, wherein generating the interactive virtual environment further comprises:

generating a virtual representation of the environment familiar to the user based on received media content and internet of things (IoT) device data, wherein generating the virtual representation further comprises converting the received media content and the IoT device data to the generated interactive virtual environment using a virtual reality (VR) converter.

17. The computer program product of claim 15, wherein automatically identifying the item and automatically correlating and associating the identified item with the corresponding location in the generated interactive virtual environment further comprises:

automatically determining a type of item associated with the identified item, and correlating and associating the identified item and the determined type of item with at least one of a virtual room from the one or more virtual rooms and a virtual area from the one or more virtual areas.

18. The computer program product of claim 17, wherein automatically identifying and retrieving the different items further comprises:

based on the correlation and association of the identified item and the determined type of item to the at least one of the virtual room and the virtual area, automatically identifying and retrieving the different items having the determined similarity to the identified item and the determined type of item from the one or more other virtual environments.

19. The computer program product of claim 18, wherein automatically presenting the different items in the corresponding location of the generated interactive environment further comprises:

automatically presenting the different items in the corresponding location of the at least one of the virtual room and the virtual area based on the determined similarity to the identified item and the determined type of item and the correlation and association of the identified item and the determined type of item to the virtual room and the virtual area.

20. The computer program product of claim 15, wherein automatically presenting the different items further comprises:

automatically projecting a virtual representation of the different items in the corresponding location, wherein automatically projecting the virtual presentation further comprises presenting virtual images of the different items and information associated with the different items.

\* \* \* \* \*